United States Patent
Almhagen et al.

(10) Patent No.: US 8,356,584 B2
(45) Date of Patent: Jan. 22, 2013

(54) FLYWHEEL ARRANGEMENT FOR AN INTERNAL COMBUSTION ENGINE

(75) Inventors: Petter Almhagen, Floda (SE); Peter Ulrik Gast, Göteborg (SE); Jonas Forssell, Torslanda (SE); Lars Johan Stenvall, Ljungskile (SE)

(73) Assignee: Volvo Car Corporation (SE)

( * ) Notice: Subject to any disclaimer, the term of this patent is extended or adjusted under 35 U.S.C. 154(b) by 879 days.

(21) Appl. No.: 12/490,440

(22) Filed: Jun. 24, 2009

(65) Prior Publication Data
US 2010/0071652 A1  Mar. 25, 2010

(30) Foreign Application Priority Data
Sep. 24, 2008 (EP) .................... 08164995

(51) Int. Cl.
*F02N 15/02* (2006.01)
(52) U.S. Cl. ................... 123/179.25
(58) Field of Classification Search ......... 123/179.1, 123/179.3, 179.25, 185.8, 185.13; 74/6, 74/7 C, 8
See application file for complete search history.

(56) References Cited

U.S. PATENT DOCUMENTS

| | | | |
|---|---|---|---|
| 4,729,465 A | 3/1988 | Reik | |
| 7,472,672 B2 * | 1/2009 | Asada et al. | 123/179.25 |
| 7,628,131 B2 * | 12/2009 | Takano et al. | 123/179.25 |
| 7,856,954 B2 * | 12/2010 | Steiner et al. | 123/179.1 |
| 2003/0197384 A1 * | 10/2003 | Vuk | 290/38 R |
| 2003/0213672 A1 | 11/2003 | Janson et al. | |
| 2007/0251482 A1 * | 11/2007 | Shirataki | 123/179.25 |
| 2008/0066707 A1 * | 3/2008 | Berger | 123/179.25 |
| 2008/0121202 A1 * | 5/2008 | Asada et al. | 123/185.14 |
| 2008/0163843 A1 * | 7/2008 | Sakai et al. | 123/179.25 |
| 2010/0065001 A1 * | 3/2010 | Spicer et al. | 123/179.28 |
| 2010/0147241 A1 * | 6/2010 | Damian et al. | 123/179.25 |
| 2011/0048358 A1 * | 3/2011 | Gaborel et al. | 123/179.25 |
| 2011/0168118 A1 * | 7/2011 | Li et al. | 123/179.25 |
| 2012/0024253 A1 * | 2/2012 | Hartmann et al. | 123/179.25 |
| 2012/0055436 A1 * | 3/2012 | Antchak et al. | 123/179.25 |
| 2012/0125280 A1 * | 5/2012 | Sugimura | 123/179.25 |

FOREIGN PATENT DOCUMENTS

| | | |
|---|---|---|
| DE | 10005001 | 2/2000 |
| DE | 102007029353 | 1/2008 |
| FR | 2598475 | 6/1987 |
| WO | WO 2006/016668 | 2/2006 |
| WO | WO 2007/012946 | 2/2007 |

* cited by examiner

*Primary Examiner* — Thomas Moulis
(74) *Attorney, Agent, or Firm* — Brooks Kushman P.C.

(57) ABSTRACT

An engine is disclosed having a flywheel arrangement comprising a starter motor (1) having a pinion gear (2) at an output shaft. The pinion gear (2) constantly engages a corresponding crank gear of a crank wheel (3) located between an engine block and a flywheel assembly (9) of the engine. The crank wheel (3) is operatively connected to a crankshaft (4) of the engine via a one-way clutch unit (5). The flywheel assembly (9) comprises a first flywheel body (6) connected to the crankshaft (4) of the engine. A second flywheel body (7) is rotatable relative to the first flywheel body (6) and coupled thereto such that is able to move elastically through a limited angular distance relative to the first flywheel body (6). An interlocking device includes at least one locking arrangement (8) and is adapted to produce an interlocking connection between the second flywheel body (7) and the first flywheel body (6) during cranking of the internal combustion engine.

15 Claims, 1 Drawing Sheet

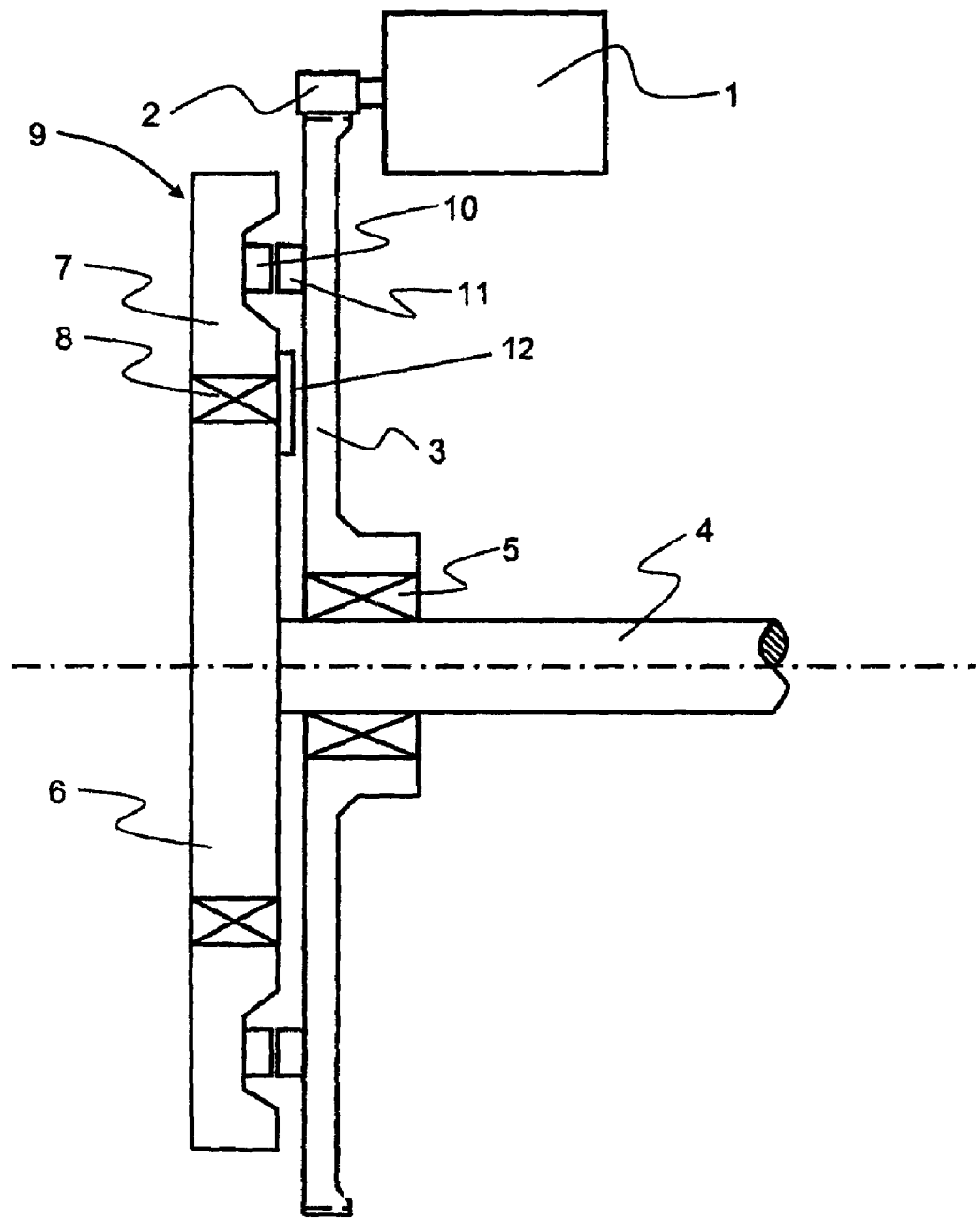

FLYWHEEL ARRANGEMENT FOR AN INTERNAL COMBUSTION ENGINE

TECHNICAL FIELD

The present disclosure is related to a flywheel arrangement for an internal combustion engine directed to reducing the level of torsional vibrations produced in the flywheel arrangement engine start-up.

BACKGROUND AND SUMMARY

It is known to use dual-mass flywheels having a pair of rotating masses which rotate freely relative to one another to a limited extent and are interconnected by a compliant member such as a spring damper system to lower the level of torsional vibrations generated by a firing internal combustion engine. The mass of the flywheel is split into a first mass and a second mass where the first mass is attached to the engine side of the damper system and the second mass is attached to a clutch/transmission side of the damper system. Dual-mass flywheels of this kind can improve overall vehicle driveability and increase the service life of various drive-train components. Drive-train vibrations are reduced by such dual-mass flywheels, which reduces rattling and droning noises, particularly at low engine speeds. The resultant smoother low-speed running allows comfortable driving at lower speeds, which helps reduce fuel consumption. The transmission is also easier to shift because of the low mass to be synchronized, and there is less synchronization wear.

A major problem with prior art dual-mass flywheels is that the natural frequencies of such systems are relatively low. This creates a problem when an engine is to be started in that the frequency of the torsional vibration excitation generated by the engine at some point in the engine start-up sequence, often below 400 rpm, matches the natural frequency of the dual-mass system causing high vibration levels and inhibiting the engine from reaching idle. When passing through a resonance frequency in the starting sequence of the engine there is the possibility that the two flywheels move in opposite directions and only stop finally when reaching end positions e.g. as the springs of a torsional vibration damper become "solid", potentially causing degradation of the flywheel assembly.

The present disclosure describes a flywheel arrangement for an internal combustion engine producing a reduced level of torsional vibration during engine start-up, where the arrangement comprises a starter motor having a pinion gear at an output shaft, which pinion gear is arranged in constant engagement with a corresponding crank gear of a crank wheel located between an engine block and a flywheel assembly of the engine, which crank wheel is operatively connected to a crankshaft of the engine via a one-way clutch unit.

In one embodiment, the flywheel assembly comprises a first flywheel body adapted to be connected to the crankshaft of the engine, a second flywheel body which is rotatable relative to the first flywheel body and coupled thereto such that is able to move elastically through a limited angular distance relative to the first flywheel body, and an interlocking device including at least one locking arrangement adapted to produce an interlocking connection between the second flywheel body and the first flywheel body during cranking of the internal combustion engine.

BRIEF DESCRIPTION OF THE DRAWINGS

By way of example only, an embodiment will now be described with reference to the accompanying drawings wherein:

FIG. 1 is a schematic view of an exemplary embodiment of a flywheel arrangement.

DETAILED DESCRIPTION OF PREFERRED EMBODIMENTS

This disclosure is based on the realisation that it would be advantageous if the torsional natural frequency of a dual-mass flywheel system could be raised during engine start-up cranking and then lowered after engine start-up for more effective control of torsional vibration levels due to the engine firing in normal operation.

In a preferred first embodiment, as shown schematically in FIG. 1, a starter arrangement comprises a starter motor 1, e.g. an electrical starter motor, having a pinion gear 2 at an output shaft. The pinion gear 2 is arranged in constant engagement, e.g. through always meshing, with a corresponding crank gear of a crank wheel 3. The crank wheel 3 is located between an engine block (not shown) and a flywheel assembly 9 of the engine.

The crank wheel 3 is operatively connected to a crankshaft 4 of the engine via a one-way clutch unit 5, and is suitably a ring gear that is arranged to rotate with the starter motor 1 and freewheel when the engine runs, thanks to the one-way clutch unit 5. As the starter motor 1 is permanently engaged to the ring gear the gear design may be refined and optimized for generating a minimum of noise during operation. In the centre of the crank wheel 3 is arranged the one-way clutch unit 5.

The dual-mass flywheel assembly 9 comprises a first flywheel body 6 adapted to be connected to the crankshaft 4 of the engine and rotate therewith. A second flywheel body 7 is arranged rotatable relative to the first flywheel body 6 and coupled thereto such that is able to move elastically through a limited angular distance relative to the first flywheel body 6. The elasticity is provided e.g. through the first and second flywheel bodies being interconnected by a compliant member 12 such as a spring damper system to lower the level of torsional vibrations generated by a firing internal combustion engine. The second flywheel body 7 is supported to be able to rotate via a bearing (not shown) with respect to the first flywheel body 6.

An interlocking device 8 includes one or more locking arrangements adapted to produce an interlocking connection between the second flywheel body 7 and the first flywheel body 6 during cranking of the internal combustion engine. Hereby the torsional natural frequency of the dual-mass flywheel assembly 9 is raised during engine start-up cranking such that the frequency of the torsional vibration excitation generated by the engine in the engine start-up sequence does not match the natural frequency of the dual-mass flywheel assembly 9.

The locking arrangement 8 is adapted to produce the interlocking connection between the second flywheel body 7 and the first flywheel body 6 when there is no relative rotational motion between the flywheel assembly 9 and the crank wheel 3 and release the interlocking connection between the second flywheel body 7 and the first flywheel body 6 in response to relative rotational motion between the flywheel assembly 9 and the crank wheel 3. Accordingly, the locking arrangement 8 will produce an interlocking connection between the second flywheel body 7 and the first flywheel body 6 every time the engine rpm becomes zero and there is no cranking. Thus, cranking will always commence with the interlocking connection between the first and second flywheel bodies 6 and 7 in place.

The locking arrangement 8 may comprise a retractable, radially from one of the flywheel bodies protruding, lock component, e.g. bolt, arranged selectively to engage a complementary locking part, such as a corresponding radial bore, in the other flywheel body, thus causing the first and second flywheel bodies 6 and 7 to rotate as one unit without any rotation relative to each other. Alternatively, the lock component may be a tooth, which is adapted to engage a tooth space. Still alternatively, any similar lock component and complementary locking part may be used for selectively achieving the interlocking connection between the second flywheel body 7 and the first flywheel body 6. In yet an alternative embodiment the locking arrangement 8 may comprise a friction clutch, arranged to selectively produce the interlocking connection between the second flywheel body 7 and the first flywheel body 6.

Upon the lock component being urged radially, e.g. against the force of a pre loaded spring, such that it disengages from the complementary locking part, rotation of the first and second flywheel bodies 6 and 7 relative to each other is allowed.

In one embodiment a release part 10 of the locking arrangement 8 is positioned at a side of the flywheel assembly 9 facing the crank wheel 3. The crank wheel 3 has a corresponding trigger element 11 adapted to interact mechanically with the release part 10, for activating a locking arrangement 8 release function as soon as the crank wheel 3 has a rotational speed lower than the rotational speed of the flywheel assembly 9. The locking arrangement 8 release function is arranged to urge the lock component, e.g. bolt or tooth, radially, such that it disengages from the complementary locking part, e.g. radial bore or tooth space, whereupon rotation of the first and second flywheel bodies 6 and 7 relative to each other is allowed. Alternatively, the locking arrangement 8 release function is arranged to disengage the friction clutch.

In an alternative embodiment, the crank wheel 3 may comprise one or more magnetic elements 11 arranged concentrically around the crankshaft 4. At least one release part 10 of the locking arrangement 8 is positioned at a side of the flywheel assembly 9 facing the magnetic elements 11 of the crank wheel 3. The at least one release part 10 comprises an induction coil, which will become energized once there is relative motion between the flywheel assembly 9 and the crank wheel 3. Relying on the thus induced electric power the locking arrangement 8 release function is arranged to electrically or electromagnetically urge the lock component, e.g. bolt or tooth, radially, such that it disengages from the complementary locking part, e.g. radial bore or tooth space, whereupon rotation of the first and second flywheel bodies 6 and 7 relative to each other is allowed. Alternatively, the locking arrangement 8 release function is arranged to disengage the friction clutch using electrical or electromagnetically operated release means. Correspondingly, as soon as there is no relative motion between the flywheel assembly 9 and the crank wheel 3, no induction will occur, and thus the lock component will once again, e.g. under the effect of a pre loaded spring, be brought to engage the complementary locking part.

Modifications to the embodiments described in the foregoing are possible without departing from the scope of the disclosure as defined by the accompanying claims.

Numerals included within parentheses in the accompanying claims are intended to assist understanding of the claims and should not be construed in any way to limit subject matter claimed by these claims.

It is the intention, therefore, to be limited only as indicated by the scope of the claims appended hereto.

The invention claimed is:

1. An internal combustion engine comprising:
   a crank shaft;
   a one-way clutch;
   a crank wheel operatively connected to the crank shaft via the one-way clutch and having a crank gear;
   a starter motor having an output shaft and a pinion gear on the output shaft, the pinion gear being arranged in constant engagement with the crank gear of the crank wheel; and
   a flywheel assembly including:
      a first flywheel body adapted to be connected to the crankshaft;
      a second flywheel body which is rotatable relative to the first flywheel body and coupled thereto such that the second flywheel body is able to move through a limited angular distance relative to the first flywheel body; and
      an interlocking device including at least one locking arrangement adapted to produce an interlocking connection between the second flywheel body and the first flywheel body during cranking of the internal combustion engine.

2. The engine according to claim 1, wherein the at least one locking arrangement is adapted to produce the interlocking connection between the second flywheel body and the first flywheel body when there is no relative rotational motion between the flywheel assembly and the crank wheel and release the interlocking connection between the second flywheel body and the first flywheel body in response to relative rotational motion between the flywheel assembly and the crank wheel.

3. The engine according to claim 2, wherein the at least one locking arrangement comprises a retractable, radially from one of the flywheel bodies protruding, lock component arranged to selectively engage a complementary locking part in the other flywheel body.

4. The engine according to claim 2, wherein the at least one locking arrangement comprises a friction clutch arranged to selectively produce the interlocking connection between the second flywheel body and the first flywheel body.

5. The engine according to claim 2, wherein the at least one locking arrangement includes a release part positioned at a side of the flywheel assembly facing the crank wheel, and the crank wheel has a corresponding trigger element adapted to interact with the release part for activating the at least one locking arrangement release function as soon as the crank wheel has a rotational speed lower than the rotational speed of the flywheel assembly.

6. The engine according to claim 3, wherein the at least one locking arrangement includes a release part positioned at a side of the flywheel assembly facing the crank wheel, and the crank wheel has a corresponding trigger element adapted to interact mechanically with the release part for activating the at least one locking arrangement release function, as soon as the crank wheel has a rotational speed lower than the rotational speed of the flywheel assembly, through urging the lock component to disengage from the complementary locking part.

7. The engine according to claim 3, wherein the crank wheel comprises one or more magnetic elements, and the at least one locking arrangement includes at least one release part positioned at a side of the flywheel assembly facing the one or more magnetic elements, the at least one release part including an induction coil, arranged to be energized once there is relative motion between the flywheel assembly and the crank wheel, for inducing electric power for the at least one locking arrangement release function to electrically or electromagnetically urge the lock component to disengage from the complementary locking part.

8. The engine according to claim 4, wherein the crank wheel comprises one or more magnetic elements, and the at least one locking arrangement includes at least one release part positioned at a side of the flywheel assembly facing the one or more magnetic elements, the at least one release part including an induction coil, arranged to be energized once there is relative motion between said flywheel assembly and said crank wheel, for inducing electric power for the at least one locking arrangement release function to disengage the friction clutch.

9. The engine according to claim 7 wherein the one or more magnetic elements include multiple magnetic elements arranged concentrically around the crankshaft.

10. The engine according to claim 8 wherein the one or more magnetic elements include multiple magnetic elements arranged concentrically around the crankshaft.

11. An internal combustion engine comprising:
a crank shaft;
a crank wheel operatively connected to the crank shaft and having a crank gear;
a starter motor having an output shaft and a pinion gear on the output shaft, the pinion gear being engaged with the crank gear of the crank wheel; and
a flywheel assembly including:
a first flywheel body connected to the crankshaft;
a second flywheel body that is rotatable relative to the first flywheel body and coupled thereto such that the second flywheel body is able to move through a limited angular distance relative to the first flywheel body; and
an interlocking device including a locking arrangement having a lock part associated with one of the flywheel bodies, and a lock component associated with the other flywheel body and being selectively engageable with the lock part, the locking arrangement being adapted to produce an interlocking connection between the second flywheel body and the first flywheel body when there is no relative rotational motion between the flywheel assembly and the crank wheel and release the interlocking connection between the second flywheel body and the first flywheel body in response to relative rotational motion between the flywheel assembly and the crank wheel;
wherein the crank wheel comprises one or more magnetic elements, and the locking arrangement includes at least one release part that is positioned at a side of the flywheel assembly facing the one or more magnetic elements of the crank wheel, and wherein the at least one release part includes an induction coil arranged to be energized once there is relative motion between the flywheel assembly and the crank wheel to induce electric power for the locking arrangement release function to electrically or electromagnetically urge the lock component to disengage from the complementary locking part.

12. The engine according to claim 11 wherein the lock component is retractable and is configured to protrude radially from the one flywheel body.

13. The engine according to claim 11 wherein the one or more magnetic elements include multiple magnetic elements arranged concentrically around the crankshaft.

14. An internal combustion engine comprising:
a crank shaft;
a crank wheel operatively connected to the crank shaft and having a crank gear;
a starter motor having an output shaft and a pinion gear on the output shaft, the pinion gear being engaged with the crank gear of the crank wheel; and
a flywheel assembly including:
a first flywheel body connected to the crankshaft;
a second flywheel body that is rotatable relative to the first flywheel body and coupled thereto such that the second flywheel body is able to move through a limited angular distance relative to the first flywheel body; and
an interlocking device including a locking arrangement having a friction clutch arranged to selectively produce an interlocking connection between the second flywheel body and the first flywheel body, the locking arrangement being adapted to produce the interlocking connection when there is no relative rotational motion between the flywheel assembly and the crank wheel and release the interlocking connection in response to relative rotational motion between the flywheel assembly and the crank wheel;
wherein the crank wheel comprises one or more magnetic elements, and the locking arrangement includes at least one release part that is positioned at a side of the flywheel assembly facing the one or more magnetic elements of the crank wheel, and wherein the at least one release part includes an induction coil arranged to be energized once there is relative motion between the flywheel assembly and the crank wheel to induce electric power for the locking arrangement to disengage the friction clutch and release the interlocking connection.

15. The engine of claim 14 wherein the one or more magnetic elements include multiple magnetic elements arranged concentrically around the crankshaft.

* * * * *